Sept. 7, 1954     E. F. SISSON ET AL     2,688,590
METHOD OF SEPARATING TALL OIL INTO A FATTY
ACID PRODUCT AND A ROSIN ACID PRODUCT
Filed Dec. 13, 1947     5 Sheets-Sheet 3
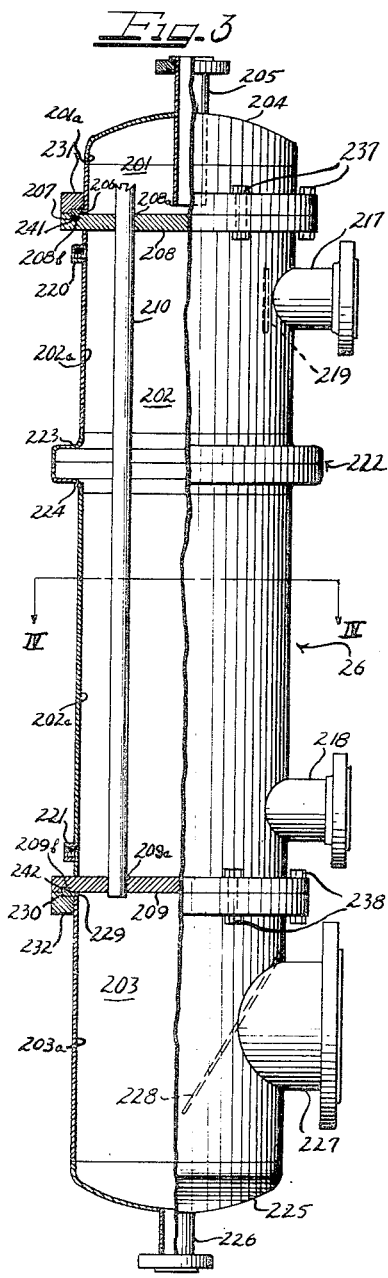
Fig. 3
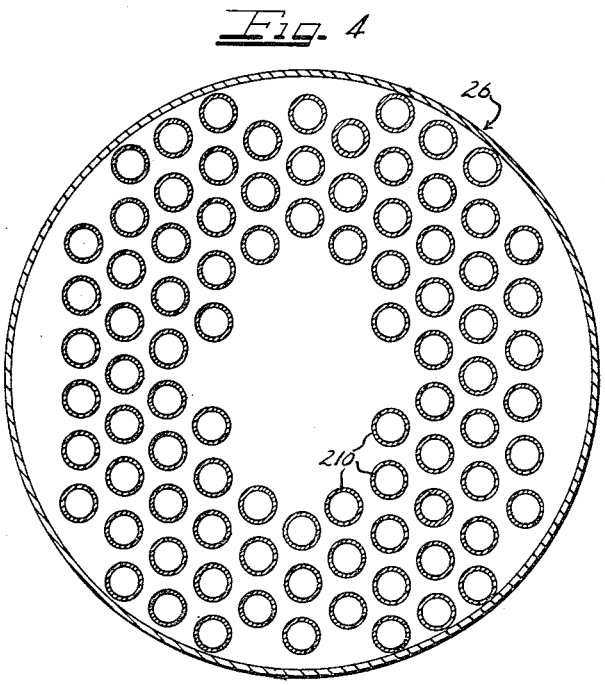
Fig. 4
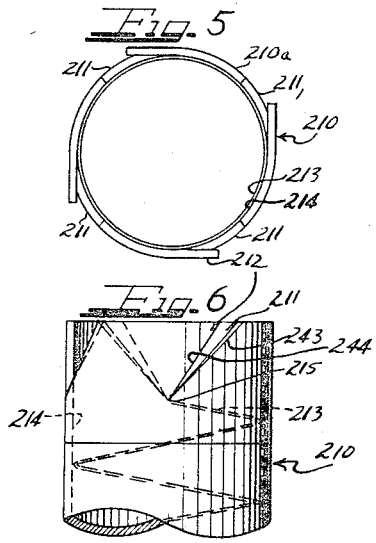
Fig. 5
Fig. 6
Inventors
EDMOND F. SISSON
RICHARD F. COLE
JACOB P. KRUMBEIN
by The Firm of Charles W. Hills Attys.

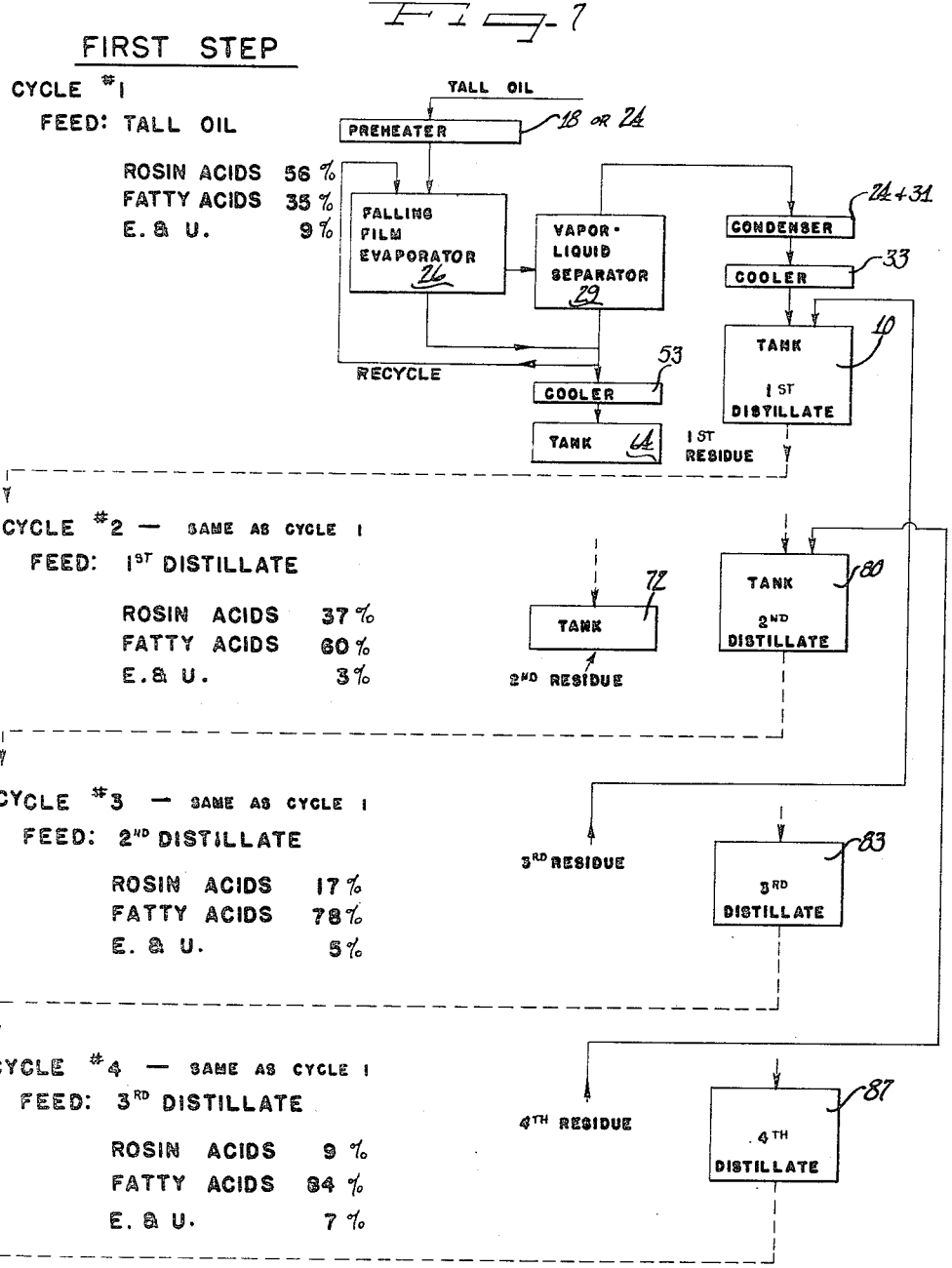

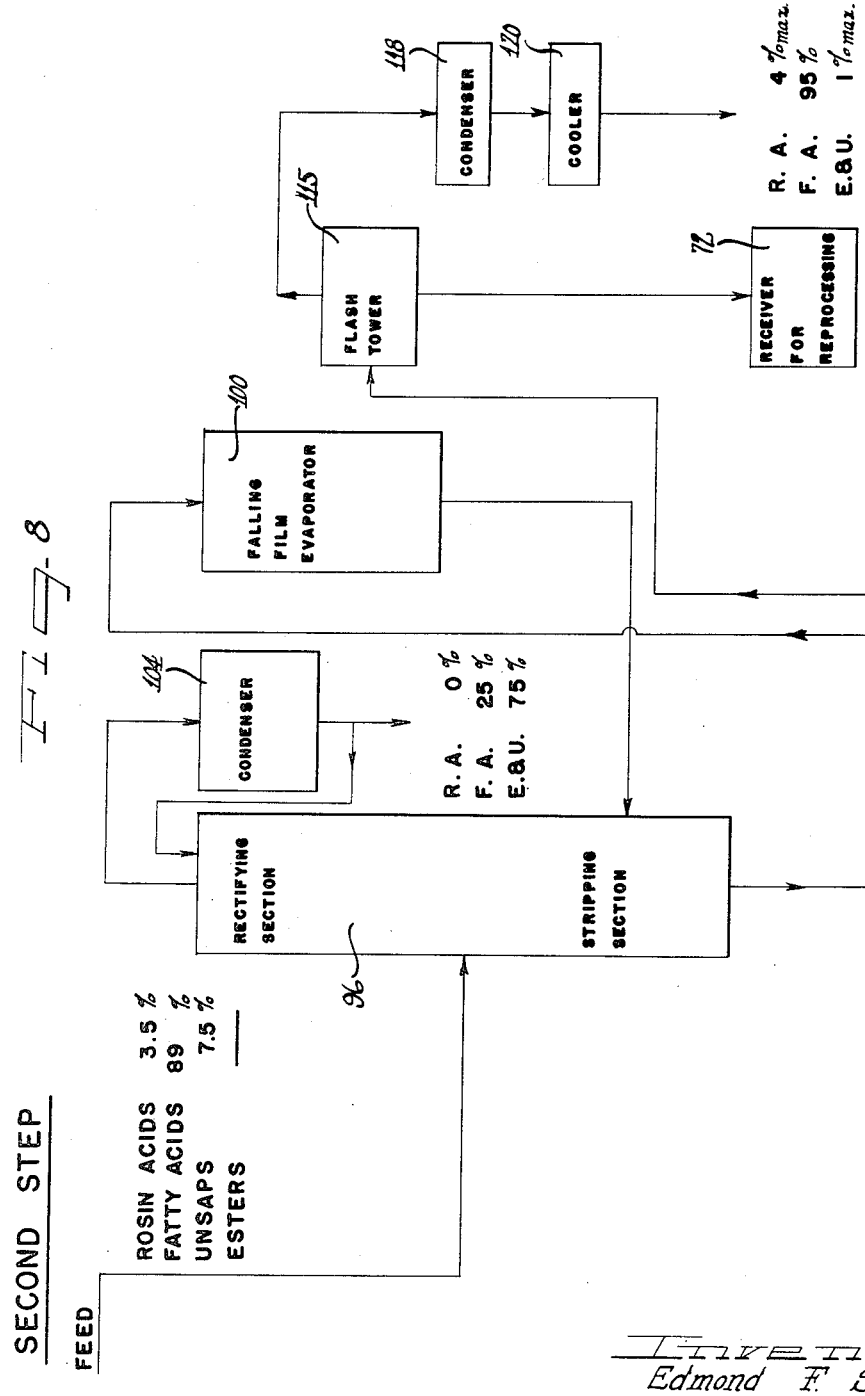

Patented Sept. 7, 1954

2,688,590

UNITED STATES PATENT OFFICE 2,688,590

METHOD OF SEPARATING TALL OIL INTO A FATTY ACID PRODUCT AND A ROSIN ACID PRODUCT

Edmond F. Sisson, Richard F. Cole, and Jacob P. Krumbein, Pensacola, Fla., assignors to Newport Industries, Inc., Pensacola, Fla., a corporation of Delaware Application December 13, 1947, Serial No. 791,490

4 Claims. (Cl. 202—52)

This invention relates to a method for the separation of a mixture of organic chemicals into its component fractions, and more particularly to the separation of tall oil into a fatty acids product and a rosin acids product. It should be understood, however, that the method herein described is applicable to the separation of any mixture of a high molecular weight fatty acid, such as oleic acid, and any other acidic compound, such as a rosin acid, into a relatively pure fatty acids product and a relatively pure rosin acids product.

Tall oil is the natural mixture of rosin acids, fatty acids, and of non-acid bodies which is obtained by the acidification of the "skimmings" of the black liquor of the alkaline paper pulp industry. "Skimmings" is the name applied to the curd, before being acidified or otherwise processed, which is skimmed from the black liquor of alkaline pulping processes. The crude tall oil, which is obtained by acidification of the skimmings, may be refined either by vacuum distillation of the crude tall oil or by processing the crude tall oil with fuller's earth, or by combinations of these steps. Any satisfactory refining operation should remove a large proportion of the color bodies and of the non-acid bodies present in the crude tall oil.

The composition of refined tall oil will vary appreciably, depending upon the producer of the black liquor, although it will usually fall within the ranges tabulated below:

|  | Percent |
|---|---|
| Rosin acids | 45 to 60 |
| Fatty acids | 35 to 50 |
| Esters and unsaponifiables | 6 to 12 |

By the method of the present invention the refined tall oil is separated into a rosin acids fraction containing 9% or less of fatty acids, a fatty acids fraction containing approximately 95% fatty acids and 5% rosin acids, and an unsaponifiable by-product fraction containing a minimum of 75% unsaponifiables.

The separation of refined tall oil by ordinary methods of fractionation is difficult to achieve, due to the fact that the rosin acids and, to a lesser extent, the fatty acids, are heat-sensitive materials which decompose when heated to temperatures approximating 260° C. In order to achieve the desired separation by fractional distillation, it is necessary to reduce the pressure in the distillation equipment to below 20 mm. and preferably below 5 mm. mercury absolute pressure. However, with conventional fractionating equipment consisting of heat exchange zones, the absolute pressure locally obtained is of sufficient magnitude to raise the temperature of the higher boiling, heat-sensitive rosin acids at the point at which heat is applied to temperatures above 260° C., with resultant high rates of decomposition. Also, with conventional vertical or horizontal tube evaporators which supply the necessary heat to perform the desired fractionation, there exists a liquid head of from 1 to 10 feet in the zone of boiling liquids in the evaporator. Hence, the bubbles of vapor are generated at approximately 20 to 200 mm. mercury pressure above the pressure in the vapor space, which in turn requires that the liquid be heated to a higher temperature in order to effect vaporization. This higher temperature, of course, results in higher rates of decomposition.

The process of the present invention eliminates these undesirable features of previous processes by performing the rosin acids—fatty acids separation in four separate equilibrium vaporization steps at below 5 mm. Hg pressure, utilizing a falling film evaporator which vaporizes the liquid at a liquid head of less than 5 mm. as compared with 1 to 5 or even 10 feet in the conventional tubular type evaporator.

The final fatty acids product from the fourth vaporization is fractionated in a packed column which utilizes a porcelain type packing material for promoting intimate contact between the ascending vapors and descending liquids, as differentiated from the conventional bubble cap fractionating column with heat exchange zones. The advantages of a packed column with respect to a bubble cap column are that the pressure drop between the upper and lower sections is reduced by at least 50%, and the fractionating efficiency for a given size is often greater than that for a comparable bubble cap column.

More specifically, the process of the present invention may be divided into two steps, the first of which comprises performing a preliminary rough separation of the rosin acids and fatty acids constituents of the tall oil in four successive equilibrium vaporizations, and a second step which comprises refining the fatty acids in the distillate from the fourth vaporization. This latter consists in first removing the unsaponifiables fraction and concentrating the same, and secondly, in distilling the residue from this latter step to produce a highly refined fatty acids product.

In the performance of the first rough separation step, the refined tall oil is pumped from a storage tank through heat exchangers which heat the oil to approximately 190° C. After passing through the final heat exchanger the oil is passed to the top of a tubular falling film evaporator. A portion of the tall oil is vaporized in the falling film evaporator, and both the vapor and unvaporized feed are passed to a separator. In the separator, the vapor and liquid phases are disengaged and the vapor is condensed and subcooled. The non-condensables from the condensers are further cooled and finally exhausted by a three-stage steam jet vacuum pump operating at less than 5 mm. mercury absolute pressure.

The combined condensed distillate flows into a plurality of receivers, maintained at 8 inches mercury absolute pressure, through a liquid seal. The function of the liquid seal is to permit the collection of the distillate at the relatively low vacuum of 8 inches mercury absolute pressure instead of the 3 to 5 mm. at which the evaporator operates. This feature permits the location of process valves at points where air leakage through the packing glands can be exhausted by the low vacuum high capacity pump. This in turn reduces the duty of the high vacuum low capacity pump which maintains the desired vacuum at the evaporator. The distillate is dropped by gravity from the receivers to a storage tank. The unvaporized tall oil from the evaporator is pumped from the liquid-vapor separator through a cooler into receiving tanks. A portion of the unvaporized oil from the separator is recycled through the falling film evaporator so that the inside surface of the tubes may be continuously wetted, and the volatile constituents further removed from the oil.

In the first equilibrium vaporization, the portion of feed stock vaporized is such as to produce a residue and distillate of the following composition:

|  | Distillate | Residue |
|---|---|---|
|  | Percent | Percent |
| Rosin Acids | 37 | 75 |
| Fatty Acids | 60 | 9 |
| Esters and Unsaponifiables | 3 | 16 |

The distillate above obtained from the first vaporization now forms the feed for the second equilibrium vaporization. The second feed is processed in exactly the same manner as described in the first vaporization except that the distillate is accumulated in a different storage tank, and that the residue is combined with the refined tall oil in the original storage tank. The composition of the distillate and the residue from the second vaporization is as follows:

|  | Distillate | Residue |
|---|---|---|
|  | Percent | Percent |
| Rosin Acids | 17 | 56 |
| Fatty Acids | 78 | 35 |
| Esters and Unsaponifiables | 5 | 9 |

The distillate from the second vaporization comprises the feed stock for the third vaporization. The sequence of operations is identical with those described above except that again the distillate is accumulated in a different storage tank, and the residue is combined with the distillate of the first vaporization. The composition of the distillate and residue thus obtained is:

|  | Distillate | Residue |
|---|---|---|
|  | Percent | Percent |
| Rosin Acids | 9 | 37 |
| Fatty Acids | 84 | 60 |
| Esters and Unsaponifiables | 7 | 3 |

The distillate of the third vaporization comprises the feed stock for the fourth vaporization. The sequence of operations is identical with those described above except that the distillate is accumulated in a different storage tank and the residue is combined with the distillate of the second vaporization. The composition of the distillate and residue from the fourth vaporization is as follows:

|  | Distillate | Residue |
|---|---|---|
|  | Percent | Percent |
| Rosin Acids | 3.5 | 17 |
| Fatty Acids | 89.0 | 78 |
| Unsaponifiables | 7.5 |  |
| Esters |  | 5 |

The four vaporization operations above described comprise the first integral step of this process, namely, the concentration of rosin acids in the refined tall oil separately from the fatty acids and unsaponifiables by four successive equilibrium vaporizations conducted at an absolute pressure of less than 5 mm. of mercury and at a liquid head of less than 10 mm. in a falling film evaporator. A fatty acids-enriched distillate is thereby obtained containing at least 85% of fatty acids, not over 5% of rosin acids and not over 10% of unsaponifiables.

The distillate from the fourth vaporization is now submitted to the second integral step of the process of the present invention. The distillate from the fourth vaporization is pumped through one or more preheaters and introduced into a vertical fractionating column at approximately the middle location of the column. The fractionating column is of the packed type utilizing a suitable packing material, and is divided into two sections, namely, a stripping section and a rectifying section. The stripping section, located in the lower portion of the column, serves to remove virtually all of the unsaponifiables from the feed stock, while the rectifying section serves to concentrate the unsaponifiable. The rectifying section is located in the upper half of the column. The absolute pressure at the top of the column is maintained at 5 mm. or less, while that at the bottom is maintained at 20 mm. or less.

The feed stock is introduced onto a plate fitted with V-notch weirs and flows down the stripping section of the column, countercurrent to rising vapors. The liquid accumulating in the bottom of the column is recycled into a falling film evaporator which vaporizes a portion of the liquid and provides the necessary heat to fractionate the feed stock. The overhead vapors from the fractionating column are condensed and a portion thereof returned to the top of the column as reflux. The non-condensables are cooled and removed from the system by a three-stage steam jet vacuum pump at 5 mm. mercury absolute or less. That portion of the distillate not returned as reflux is accumulated in a receiver operating at 8 inches mercury absolute pressure. From the receiver the distillate is dropped into a storage tank.

The composition of the distillate and residue from the fractionating column is as follows: The distillate contains 75% unsaponifiables, 25% fatty acids and practically 0% rosin acids: the residue contains 94% fatty acids, 5% rosin acids and a maximum of 1% unsaponifiables.

A portion of the liquid drawn from the bottom of the fractionating column is pumped to a flash tower operating at 5 mm. or less mercury absolute pressure, where a major proportion of the feed stock is flashed off. The distillate, comprising the fatty acids product, from the flash tower is condensed and accumulated in a receiver. The residue from the flash tower is accumulated in a receiver and returned to the first phase of the process for reworking.

The composition of the distillate from the flash tower is as follows: a minimum of 95% fatty acids, a maximum of 4% rosin acids, and a maximum of 1% unsaponifiables. The residue from the flash tower contains approximately equal portions of rosin acids and fatty acids.

Thus it may be seen that we have provided an efficient process for the separation of a mixture of fatty acids and rosin acids into component parts.

It is, therefore, an important object of the present invention to provide an improved method for the separation of a mixture containing high molecular weight fatty acids and rosin acids into its component fractions.

It is a further important object of this invention to provide a novel and improved method for effecting a separation of a mixture of high molecular weight fatty acids and rosin acids by a combination of vaporization and fractionation steps carried out under such high vacuum as to prevent any substantial decomposition of the heat sensitive rosin acids.

It is another important object of the present invention to provide for the separation of refined tall oil into two fractions, one of which contains at least 95% fatty acids and less than 5% rosin acids.

It is a still further important object of the present invention to provide an improved method for the separation of tall oil into its component fractions, which method employs a falling film type of evaporation under absolute pressures of less than 20 mm. Hg to vaporize the volatile constituents of the tall oil.

Other and further important objects of this invention will be apparent from the disclosures in the specification and the accompanying drawings, in which:

Figures 1 and 2 together constitute a complete flow sheet presenting a schematic illustration of the complete process of the present invention;

Figure 3 is an elevation, partly broken away and in section, of the tubular vertical falling film evaporator for use in the method of the present invention;

Figure 4 is a sectional view taken substantially along the line IV—IV of Figure 3;

Figure 5 is a top plan view of the upper end of one of the pipes of the tubular vertical falling film evaporator illustrated in Figure 3; and Figure 6 is a fragmentary elevational view of the upper end of the pipe illustrated in Figure 5;

Figure 7 is a block diagram illustrating the first step of the method of our invention, comprising cycles numbers 1 to 4, inclusive; and Figure 8 is a block diagram illustrating the second step of the method of our invention, starting with the fourth distillate of cycle No. 4 of the first step as the feed for the second step.

Figure 1:
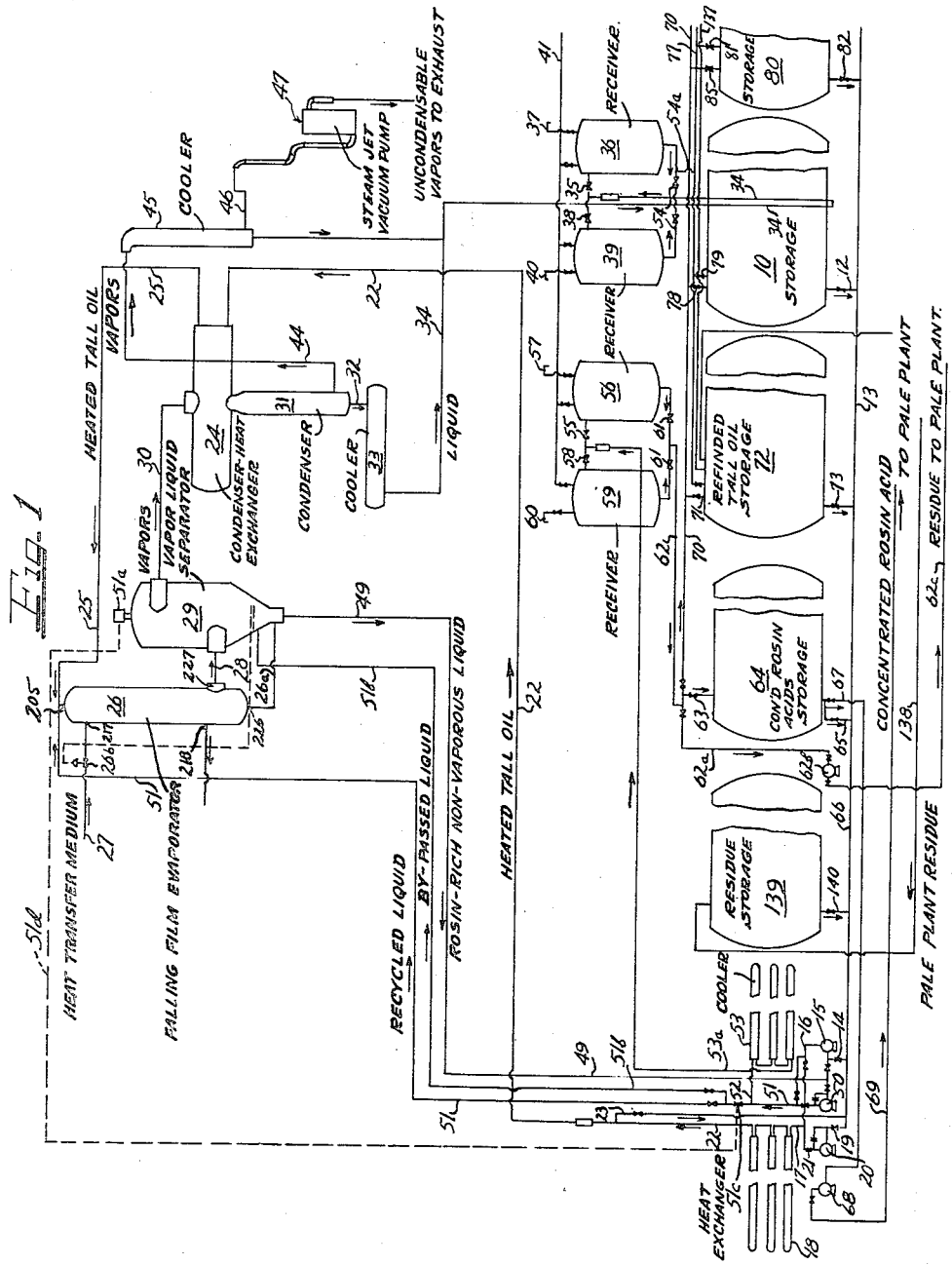

In the block diagrams the same reference numerals are used to refer to the same pieces of equipment as are used for such pieces of equipment in Figures 1 to 6, inclusive, of the drawings. The symbols "E. & U." in these block diagrams indicate esters and unsaponifiables; the term "R. A." is an abbreviation for rosin acids, and the term "F. A." is an abbreviation for fatty acids.

Figure 2:
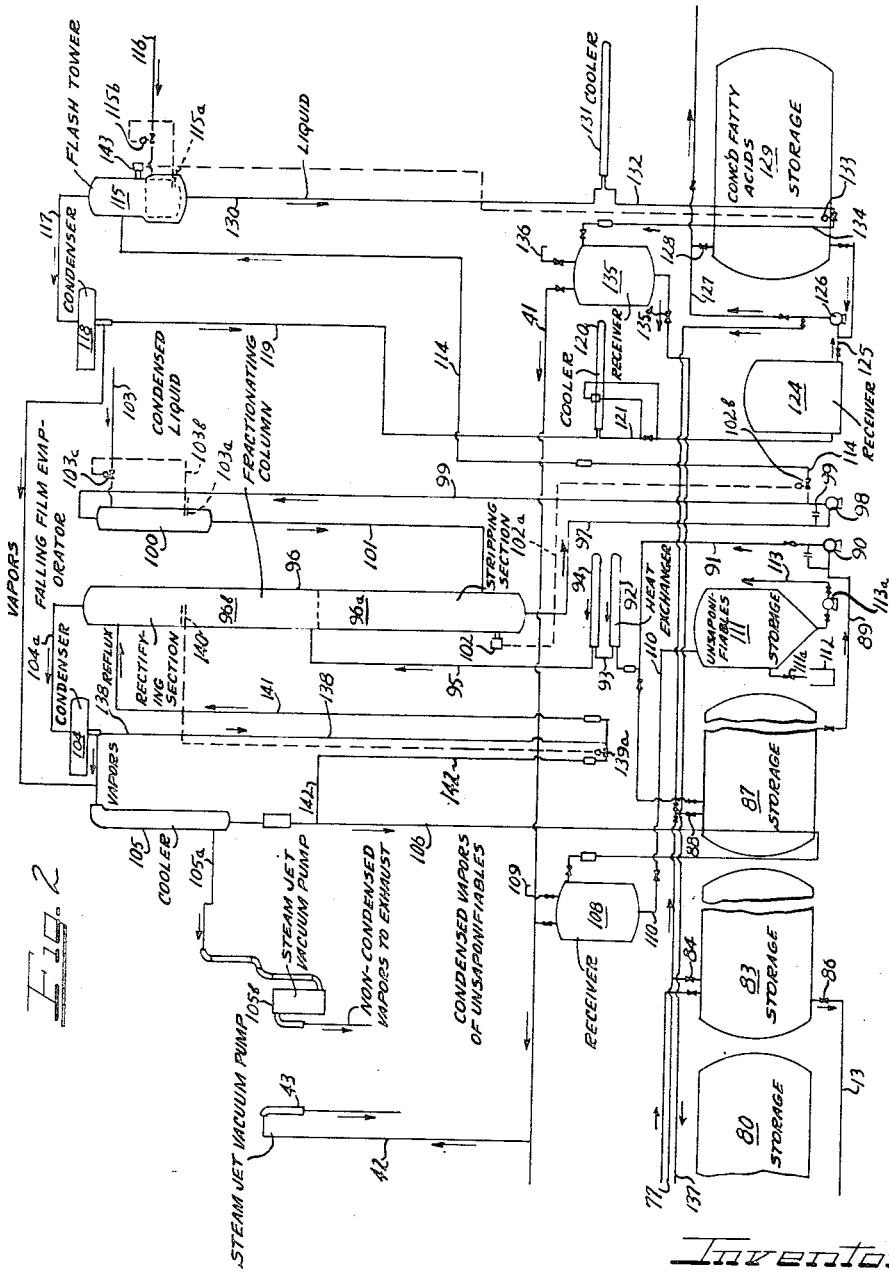

With reference to the flow sheet diagrams of Figures 1 and 2, refined tall oil, assumed to consist of 56% by weight of rosin acids, 35% fatty acids, and 9% esters and unsaponifiables, is stored in tank 72 (Figure 1). The oil is drawn from the storage tank 72 through lines 73 and 13, the valve 19 being open, and pumped by means of pump 20 through lines 21 and 17 to a steam heated exchanger 18. Alternatively, the tall oil may be drawn by pump 15 from tank 72 by opening valve 14, and pumped through line 16 and line 17 into the heat exchanger 18. The oil is heated in the heat exchange 18 to a temperature of approximately 120° C. The heated oil is then pumped through line 22 to a combination heat exchanger and condenser 24.

Alternatively, the heated oil from the heat exchanger 18 may be recycled through line 23 to either of the pumps 20 or 15 to be reheated in the heat exchanger 18.

The oil which has been heated in the heat exchanger 18 is further heated in apparatus 24 to a temperature of 190° C. by condensation of vapors as will be explained hereafter. The heated oil at a temperature of 190° C. is pumped from the apparatus 24 through line 25 to the top of a vertical falling film tubular evaporator 26.

The tubular evaporator 26 (Figure 3) comprises an inlet chamber 201, a heat transfer chamber 202, and an outlet chamber 203. The inlet chamber 201 is cylindrical in shape having a generally upwardly dished upper end 204. An inlet pipe 205, centrally located at the top point of the upper end 204, extends through the upper end 204 into the interior of the inlet chamber 201. A steel ring 206 is fixedly attached, as by welding, to the lower extremity of the walls 201a of the cylindrical section of the inlet chamber 201. The ring 206 is of the same inside diameter as the inlet chamber 201 and is of greater outside diameter. A depending annular flange 207 is provided around the outer periphery of the ring 206 for a purpose to be hereafter described.

The cylindrical heat transfer chamber 202 is defined by walls 202a and identical circular plates 208 and 209. The plates 208 and 209 are of a diameter greater than that of the chamber 202 proper and are provided with annular grooves 208b and 209b which are of substantially the same dimensions as the annular flange 207 of ring 206 to receive said flange. A plurality of vertically aligned holes 208a and 209a are drilled through the plates 208 and 209, respectively, within that portion of each plate which lies within the chamber 202. Pipes 210 are inserted into the holes 208a and 209a and held therein by conventional means, as by rolling, so that the pipes 210 extend through chamber 202 into inlet chamber 201 above plate 208 and below plate 209 into outlet chamber 203. Only one pipe 210 is shown in Figure 3, the plan arrangement of the pipes 210 in the chamber 202 being shown by Figure 4.

The upper extremities of the pipes 210, which extend into the inlet chamber 201, are formed as shown in Figures 5 and 6. The wall 210a of each pipe is radially cut along a straight line 244 extending downwardly from the upper edge on the pipe surface at an angle of approximately 60°. A second radial cut is made along line 243 at an angle of approximately 45° from the same edge of the pipe, the second cut joining the first at a point below the upper edge of the pipe to define a cut-out angle of approximately 15°. A cut-out 211 is thus provided in the upper section of each pipe 210. That section of the pipe directly above the cut-out 211 is then bent to provide a surface 212 which extends tangentially beyond the circumference of the pipe 210. Four such cut-out portions 211 are provided as shown in Figure 5. Each of the cut-out portions 211 is diametrically opposed to another portion 211. A stainless steel wire 213 is secured to the inside surface 214 of each pipe 210 at the apex 215 of each of the cut-out portions 211 and extends helically around the inside surface 214 of the pipe 210 for the full length thereof and is secured thereto at points spaced therealong. A wire 213 is attached at each of the apices 215 provided on each pipe 210. The method of winding the wire 213 is shown in Figure 6, only one of the four such wires being illustrated.

The heat transfer chamber 202 (Figure 3) carries two flanged nipples 217 and 218 which extend outwardly from the wall 202a of the chamber 202. Nozzle 217 is positioned slightly below plate 208 and nozzle 218 is positioned slightly above plate 209. A vertical baffle plate 219 is positioned directly inside the nozzle 217 within the chamber 202. The plate 219 is rectangular and is welded to the wall 202a of chamber 202. Two internally threaded pipe fittings 220 and 221 are positioned on wall 202a opposite the nozzles 217 and 218. Fitting 220 is positioned slightly above the extended axis or nozzle 217 and fitting 221 is slightly below the nozzle 218. An expansion joint 222 is provided in the wall 202a of heat transfer chamber 202.

The expansion joint 222 may be conveniently provided by making the chamber 202 in two cylindrical sections and welding to the ends thereof flared annular portions 223 and 224, respectively, which are then welded to each other to form an enlarged diameter expansion joint.

The outlet chamber 203 is cylindrical in shape and provided with a downwardly dished lower end portion 225. An outlet nozzle 226 extends from the lowest portion of the end 225. A side outlet nozzle 227 is provided for the chamber 203 in vertical alignment with nozzles 217 and 218.

The cross-sectional area of outlet nozzle 227 is substantially greater than the cross-sectional areas of nozzles 217 and 218. A baffle plate 228 is provided in the outlet chamber 203 attached to the wall 203a at a point above the outlet nozzle 227 and extending obliquely and downwardly approximately half-way across the chamber 203.

The outlet chamber 203 is provided at its upper end with a steel ring 229 which is identical with ring 206 of chamber 201. The ring 229 is affixed to the upper extremities of wall 203a of chamber 203 with an annular flange 230 extending upwardly from the ring 229.

The shells forming the chambers 201 and 203 are fastened to the shell forming the chamber 202 by means of collars 231 and 232. Bolts 237 and 238 pass through registering holes in the plates 208 and 209 and in collars 231 and 232, securely fastening the chambers together to form the evaporator 26. Circular resilient gaskets 241 and 242 fitting into channels 208b and 209b in plates 208 and 209, respectively, provide seats for the flanges 207 and 230, respectively, to form a vacuum tight seal between the chambers 201, 202 and 203.

The heated liquid at a temperature of 190° C. enters the evaporator 26 through line 25. The evaporator is operated at an absolute pressure of less than 5 mm. Hg and preferably at about 3 mm. Hg. The oil passes through inlet pipe 205 onto the upper surface of plate 208 and rises within the inlet chamber 201 to the level of the apices 215 of the cut-out portions, or weirs, 211. The oil flows into the pipes 210 along the wires 213 to be spread evenly in thin layers along the inner walls 214 of said pipes 210. The volume rate of flow of feed stock is so regulated that at all times the liquid is being vaporized at a liquid head less than 5 mm.

A vaporized heat transfer medium, such as a mixture of diphenyl and diphenyl oxide, is fed from line 27 into the nozzle 217 at a temperature of approximately 275° C. The baffle plate 219 aids in distributing the heat transfer medium through the spaces provided between the pipes 210. The sensible and latent heat liberated by the condensation of the heat transfer medium within chamber 202 is employed to vaporize the more volatile constituents of the oil flowing as thin films through the pipes 210. The condensed heat transfer medium is removed through the outlet nozzle 218 to be reheated and after being vaporized is again admitted through inlet nozzle 217. The temperature of the evaporator is regulated by thermocouples (not shown) located in the separator 29. The thermocouples control the amount of heat transfer medium admitted to the evaporator through valve 26b as shown in Figure 1.

The liquid-vapor mixture flows through pipes 210. Vapor and entrained liquid flow out through the outlet nozzle 227, while non-vaporized liquid flows out through nozzle 226. Both streams flow to the vapor-liquid separator 29, through lines 28 and 26a respectively.

The vapor-liquid separator 29 is maintained at a pressure of less than 5 mm. Hg. The vapor-liquid mixture is separated in the separator 29, the liquid passing through line 49 as will be hereafter described, and the vapors, which are considerably richer in fatty acids than the liquid, passing through line 30 to the combination condenser-heat exchanger 24 and condenser 31. The pressure within the heat exchanger-condenser 24 and condenser 31 is also maintained at less than 5 mm. Hg. The latent heat of vaporization given up by the vapors passing through the condenser 24 is utilized to heat the oil entering the combination condenser-heat exchanger 24 through line 22 and leaving the apparatus through line 25. Some of the uncondensed vapors passing through apparatus 24 are condensed in condenser 31. The condensate from condenser 31 is passed through line 32 and subcooled in a cooler 33.

The liquid from cooler 33 passing to receivers 36 and 39 through line 34 flows through a U-tube seal which enables receivers 36 and 39 to operate at an absolute pressure of 8 inches Hg. The liquid may be passed into receiver 36 by closing valve 38 and opening valve 35, or the liquid may be passed to the receiver 39 by closing valve 35 and opening valve 38. When a desired quantity of liquid has been accumulated in the receivers 36 and 39 the vacuum is removed by release of air vent 37 or 40. Valves 54 are opened and the liquid passes through lines 54a and 77 and valve 79 to storage tank 10.

Uncondensed vapors from the condenser 31 are drawn through line 44 to be subcooled in a cooler 45. Condensed vapors from cooler 45 are introduced into the main stream in line 34 through line 48, and uncondensable vapors from cooler 45 are drawn through line 46 by a three-stage steam jet vacuum pump 47 and exhausted from the system.

A portion of the liquid, which is lean in fatty acids, from the separator 29 is passed through line 49, pump 50 and line 51 through line 52 into a cooler 53. Liquid passing through the cooler 53 is withdrawn through line 53a and passed into tank 59 or 56. The liquid may be passed into tank 56 by closing valve 58 and opening valve 55, or into tank 59 by closing valve 55 and opening valve 58. The receivers 56 and 59 are maintained at a vacuum of 8 inches of mercury by a steam jet vacuum pump 43 which is connected to the receivers through lines 41 and 42. When a sufficient amount of residue has accumulated in receivers 56 and 59, the pressure therein may be brought to atmospheric pressure by means of air vents 57 and 60 respectively, and either or both of valves 61 may be opened to allow the liquid to flow through lines 62 and 63 to tank 64.

The amount of liquid being pumped to the receivers 56 and 59 is regulated by a liquid level control 51a located in separator 29. The control 51a controls valve 51c by a connection 51d. Should the liquid level in separator 29 fall below a predetermined level, valve 51c is opened, allowing liquid from separator 29 to be recycled through line 51 to the top of the evaporator or by-passed through line 51b to the separator 29. The rate of liquid collection in receivers 56 and 59 is determined by the level of liquid in the separator 29.

This completes one cycle of the operation. The residue collected in this first cycle comprises 9% fatty acids, 75% rosin acids and 16% esters and unsaponifiables. The distillate which is stored in tank 10 contains approximately 60% fatty acids, 37% rosin acids and 3% esters and unsaponifiables. This distillate is again processed in a manner identical to the above described operation by allowing the liquid to flow through line 12 into line 13 and thence through the same cycle previously described. The distillate, which is again collected in receivers 36 and 39 is this time dropped to tank 80. The collection in tank 80 is accomplished by the venting of tank 36 and 39 as before described, the opening of valves 54 allowing the liquid to flow to line 77, and the opening of valve 81 allowing the liquid to flow into tank 80.

The residue, which is again collected in tanks 56 and 59, is allowed to flow into tank 72 by the venting of the tanks 56 and 59 in the manner above described, opening the valves 61 and allowing the liquid to flow through line 62 and line 70. Valve 71 is opened, allowing the liquid to flow into tank 72.

The distillate collected in tank 80 contains approximately 78% fatty acids, 17% rosin acids and 5% esters and unsaponifiables. The residue collected in tank 72 contains approximately 35% fatty acids, 56% rosin acids, and 9% esters and unsaponifiables.

The liquid from tank 80 is again reprocessed by the opening of valve 82 allowing the liquid to flow into the line 13 and from there throughout the same cycle previously described.

The overhead, or distillate, is again collected in tanks 36 and 39 and the residue is again collected in tanks 56 and 59. In this instance, the receivers 36 and 39 are emptied into the storage tank 83 by venting the receivers 36 and 39 through air vents 37 and 40 as hereinbefore described, opening valves 54 and allowing the liquid to flow into line 77. Valve 84 is opened, allowing the liquid to flow into tank 83.

The residue which has again been collected in receivers 56 and 59 is this time stored in storage tank 10. The transfer to tank 10 is accomplished by venting the tanks 56 and 59 through air vents 57 and 60 as hereinbefore described, opening valves 61 and thus allowing the residue to flow through line 62 and line 70. Valve 78 is then opened allowing the residue to flow into tank 10.

The distillate which is stored in tank 83 contains approximately 84% fatty acids, 9% rosin acids and 7% esters and unsaponifiables. The residue which is stored in tank 80 contains approximately 60% fatty acids, 37% rosin acids and 3% esters and unsaponifiables.

The distillate which is contained in storage tank 83 is recycled by opening valve 86, allowing the liquid distillate to flow through line 13, and from there through the same cycle as before. The distillate is again collected in tanks 36 and 39. The tanks 36 and 39 are emptied as above described by releasing the vacuum by opening the air vents 37 and 40 on tanks 36 and 39 respectively, opening the valves 54 allowing the distillate to flow into line 77. The distillate is collected in storage tank 87 by opening of valve 88 allowing the distillate to flow from line 77 into tank 87.

The residue from this fourth vaporization is again collected in the receivers 56 and 59 as before described. The receivers 56 and 59 are emptied by first opening the air vents 57 and 60 respectively, and the valves 61 allowing the liquid in the tanks to flow through line 62 and line 70. The residue is now collected in storage tank 80 by opening valve 85 allowing the liquid to flow into the tank 80 from the line 70. The residue from this fourth vaporization is thus combined with the distillate from the second vaporization. The distillate which is thus collected in tank 87 contains approximately 89% fatty acids, 3.5% rosin acids and 7.5% unsaponifiables and nil esters. The residue collected in tank 80 contains approximately 78% fatty acids, 17% rosin acids, nil unsaponifiables and 5% esters.

The operations just described comprise the first integral step of the process, namely, the concentrating of rosin acids in the refined tall oil from the fatty acids and unsaponifiables by four successive equilibrium vaporizations conducted at an absolute pressure of approximately 3 mm. Hg in the falling film evaporator 26.

The distillate from the fourth vaporization is next subjected to the second part of the process to complete the separation of the unsaponifiables from the fatty acids.

The distillate from storage tank 87 is removed through line 89 by pump 90. The distillate is pumped by pump 90 through line 91 to a steam heated heat exchanger 92 and through line 93 to a diphenyl-diphenyl oxide heated heat exchanger 94. The heated distillate is then passed through line 95 to a fractionating column 96. The distillate is fed into the fractionating column 96 at a point which approximates the middle of the column. The lower half of the fractionating column 96 constitutes a stripping section 96a, wherein the maximum pressure is less than 20 mm. Hg and preferably at about 15 mm., and the upper half of the fractionating column constitutes a rectifying section 96b, wherein the minimum pressure is less than 5 mm. Hg, and preferably is about 3 mm. Hg. The function of the stripping section is to remove substantially all of the unsaponifiables from the fatty and rosin acids, while that of the rectifying section is to concentrate the unsaponifiables. The entire column 96 is packed with a porcelain packing material. Liquid introduced into the column, either through line 95 or as reflux, flows down the column over the surface of the packing, countercurrent to the rising vapors. The packing insures intimate contact between the liquid and vapor phases. Liquid reaching the bottom of the column is recirculated through line 97, pump 98 and line 99 to a falling film evaporator 100. The falling film evaporator 100 is identical except for size with the evaporator 26 and is heated by a mixture of diphenyl and diphenyl oxide introduced into the evaporator through line 103. Evaporator 100 serves only to heat the recirculated liquid. The temperature of the recirculated liquid is determined by a thermocouple 103a inserted in the lower portion of the evaporator 100. The thermocouple 103a in line 103b determines the flow of heat transfer medium by controlling a valve 103c in line 103. The amount of liquid drawn off through the bottom of the column 96 is regulated by a liquid level control 102, associated with the fractionating column 96 and connected by means of a line 102a to an electrically operated valve 102b.

The overhead vapors, viz., the vapors issuing from the top of the fractionating column 96, are conducted through line 104a to a condenser 104. A major portion of the condensed vapors from condenser 104 is returned to the fractionating column as reflux through lines 138 and 141. The amount of liquid from the condenser 104 which is returned to the fractionating column 96 as reflux is determined by a thermocouple 140 in the rectifying section 96b of the fractionating column 96. The thermocouple 140 regulates a valve 139a which is located between line 142 and line 138. If less liquid should be recycled as reflux, valve 139a is opened allowing the condensate from condenser 104 to flow through line 142.

The uncondensed vapors from condenser 104 are introduced into a cooler 105 where a portion of the vapors are condensed under a pressure of less than 5 mm. Hg. The non-condensed vapors from cooler 105 are exhausted from the system through line 105a and a vacuum pump 105b at 3 mm. Hg absolute. The condensed vapors from cooler 105, together with the condensate from condenser 104 which is not reintroduced into the fractionating column as reflux, pass through line 106 and through a U-tube liquid seal into receiver 108 which is maintained at an absolute pressure of 8 inches of mercury. When receiver 108 is filled, it is vented to the atmosphere through air vent 109 and the liquid is transferred to tank 111 through line 110. The contents of tank 111 which contain a high percentage of unsaponifiables may be removed by opening a valve 111a and collecting the liquid in a container 112. If desired, the contents of tank 111 may be pumped to a suitable storage vat (not shown) through line 113 by pump 113a.

That portion of the liquid drawn off from the bottom of the fractionating column 96 through line 97 which is not returned to the fractionating column through the evaporator 100 may be pumped by pump 98 through line 114 to a flash tower 115. The flash tower 115 is operated at an absolute pressure of less than 5 mm. and preferably of 3 mm. Hg. The liquid introduced into the flash tower through line 114 is at an equilibrium temperature, which will ordinarily be around 450° F., corresponding to an absolute pressure of 10 to 20 mm. of mercury. The flash tower 115 is heated as necessary by a mixture of diphenyl and diphenyl oxide introduced through line 116. The temperature of the flash tower 115 is regulated by a thermocouple 115a located in the heating jacket of the tower 115, and will, in general, be around 410° F. The amount of diphenyl-diphenyl oxide introduced into the jacket is controlled by the thermocouple controlled valve 115b. The liquid entering the flash tower 115 through line 114 is flashed into the vapor phase by the sudden reduction of pressure.

The vapors thus obtained are passed from the flash tower 115 through line 117 to a condenser 118 which is maintained at a pressure of less than 5 mm. Hg. The condensed liquid in condenser 118 is passed through line 119 and through a cooler 120.

The cooled liquor from cooler 120 is passed through line 121 to receiver 124, this receiver being maintained at atmospheric pressure. Receiver 124 can be maintained at atmospheric pressure and still collect the condensate from condenser 118 by virtue of the difference in elevation between the two. The material from the accumulator 124 is withdrawn through a line 125 and pumped by pump 126 through line 127 and valve 128 into a storage tank 129.

The liquid which is not vaporized in the flash tower 115 is held in the lower portion of the flash tower by a level control 143 which controls valve 133 which is located in a line 130. The purpose of the level control 143 is to insure the presence of liquid in a portion of the tower which is heated by the diphenyl-diphenyl oxide mixture introduced into the flash tower 115 by line 116. If the level of liquid in the flash tower falls below that indicated by device 143, valve 133 is closed preventing the fall of liquid in the heated portion. When the liquid level is above that of device 143, the liquid in the flash tower is drained through line 130 to cooler 131 and from the cooler 131 through line 132, valve 133 and line 134 to the receiver 135. When the receiver 135 is full, it is vented to atmospheric pressure by opening air vent 136, valve 135a is opened and the contents of tank 135 are drained through line 137 to tank 72 to be reprocessed.

Storage tank 129 thus receives a fatty acids fraction containing 95% fatty acids, not more than 4% of rosin acids and not more than 1% of unsaponifiables. Tank 111 contains the unsaponifiables and tank 64 contains the concentrated rosin acids. The concentrated rosin acids in tank 64 may be pumped through line 67 by pump 68 into line 69 to a pale rosin plant for further processing. The residue collected in receivers 56 and 59 may be pumped through line 62 and 62a by pump 62b into line 62c to a pale plant to be reprocessed rather than to the storage tanks. If the process is used in connection with a pale rosin plant to remove residual fatty acids from the plant residue, the residue may be pumped into tank 139 through line 138, and drawn out of tank 139 through line 140 into line 13 for passing through the cycle above described.

The method of our invention thus enables the concentration of the rosin acids in a fraction containing only a small proportion of the fatty acids originally present, without, however, distilling more than a minor proportion of the rosin acids.

It will be understood that a greater or fewer number of equilibrium vaporization steps than the four here specified may be used and that other changes in the method of our invention may be made within the scope of the appended claims. It is, therefore, not the purpose to limit

We claim as our invention:

1. The process for the separation of fatty acids from refined tall oil containing fatty acids, rosin acids and unsaponifiables, which comprises preheating the tall oil in the absence of a solvent to a temperature less than the decomposition temperature of the rosin acids content of said tall oil, introducing the heated oil into an evaporating zone maintained at a pressure of less than 5 mm. and a temperature of less than 260° C., removing from said evaporating zone a stream composed of vaporized lower boiling constituents rich in fatty acids and residual liquid rich in rosin acids, separating said vaporized lower boiling constituents from said residual rosin acids-rich liquid at a pressure of less than 5 mm., condensing said vaporized lower boiling constituents to obtain a fatty acids-rich fraction, recycling a portion of said residual liquid through said evaporation zone to vaporize the fatty acids contained therein, recycling said fatty acids-rich fraction through said preheating step, said evaporation zone, and said condensation step until a fraction is obtained which contains at least 85% fatty acids, and then heating said fraction containing at least 85% fatty acids to a temperature below the decomposition temperature of the said fraction, introducing the heated fraction into a fractionating zone having an upper rectifying section and a lower stripping section at a point between said sections, maintaining said stripping section at a pressure of less than 20 mm. to remove an unsaponifiables-rich fraction and maintaining said rectifying section at a pressure of less than 5 mm. to concentrate said unsaponifiables-rich fraction as overhead vapors, condensing and cooling said vapors from said rectifying section into a liquid fraction, returning a portion of the resulting liquid fraction as reflux to said rectifying section, recycling a portion of the fatty acids-rich liquid fraction from the stripping section through a heating zone maintained at a pressure of less than 20 mm. of mercury and a temperature of less than 260° C. back into said stripping section of said fractionating zone, introducing the remainder of said fatty acids-rich liquid fraction from said fractionating zone into a reduced pressure zone maintained at a pressure of less than 5 mm. pressure and a temperature less than 260° C., to vaporize the fatty acids in said liquid fraction, and condensing the resulting fatty acids vapors to obtain a product which contains at least 95% fatty acids.

2. A process for the separation of refined tall oil into a fatty acids fraction, a rosin acids fraction and an unsaponifiables fraction, which comprises preheating the tall oil to a temperature less than the decomposition temperature of the rosin acids content of said tall oil in the absence of solvent, introducing the heated oil into an evaporating zone maintained at a pressure less than 5 mm. and a temperature of less than 260° C., removing from said evaporating zone a stream composed of a vaporized fatty acids-rich fraction and residual rosin acids-rich liquid, separating said fatty acids-rich fraction from said rosin acids-rich liquid, condensing said vaporized fatty acids-rich fraction to obtain a liquid fatty acids-rich fraction and collecting said fatty acids-rich fraction, a portion of said rosin acids-rich liquid being recycled through said evaporation zone to further vaporize the fatty acids contained therein, said collected fatty acids-rich fraction being recycled through said preheating step, said evaporation zone, and said separation step until a fraction is obtained which contains at least 85% fatty acids and a maximum of 8% rosin acids, the remainder of said fraction consisting of unsaponifiable products, and then heating said fraction containing at least 85% fatty acids to a temperature less than 260° C., introducing the heated fraction into a fractionating zone having an upper rectifying section and a lower stripping section at a point between said sections, maintaining said stripping section at a pressure less than 20 mm. of mercury absolute to remove a fatty acids-rich fraction substantially free of unsaponifiables and maintaining the top of said rectifying section at a pressure less than 5 mm. of mercury absolute to concentrate said unsaponifiables-rich fraction as overhead vapors, condensing and cooling said vapors from said rectifying section, returning a portion of the resulting liquid fraction as reflux to said rectifying section, recycling a portion of the fatty acids-rich liquid fraction from the stripping section through a heating zone maintained at a pressure of less than 20 mm. of mercury absolute and a temperature of less than 260° C., said recycled portion being introduced into said stripping section of said fractionating zone, introducing the remainder of said fatty acids-rich liquid fraction from said fractionating zone into a reduced pressure zone maintained at a pressure of less than 5 mm. and a temperature less than 260° C. to vaporize the fatty acids in said liquid fraction, condensing the resulting fatty acids vapors to obtain a product containing at least 95% fatty acids, not more than 4% rosin acids, and not more than 1% unsaponifiables.

3. In the method of recovering fatty acids from a mixture of fatty acids, rosin acids and unsaponifiables, the steps of introducing said mixture at an elevated temperature below 260° C. into a fractionating column at a point intermediate an upper rectifying section and a lower stripping section, the upper section of said fractionating column being maintained at an absolute pressure of about 3 mm. Hg and the lower section being maintained at an absolute pressure below 20 mm. Hg, withdrawing vapors from said upper section, condensing said vapors to provide a liquid rich in unsaponifiables, returning a part of said liquid as reflux to said upper section, withdrawing liquid from said lower section, subjecting a portion of said last mentioned liquid to evaporation, supplying external heat to said liquid while in film form to heat and partially vaporize the same, leading the resulting vapors and liquid into said lower section, partially flashing the remaining portion of said liquid withdrawn from said lower section into vapor at a pressure substantially less than that obtaining in said lower section and condensing said last mentioned vapor to obtain a substantially pure fatty acid condensate.

4. In a process of separating tall oil into a fatty acids product and a rosin acids product, the steps which comprise preheating the tall oil in the absence of a solvent to a temperature less than the decomposition temperature of the rosin acids components of said oil, introducing the heated oil into an evaporating zone maintained at a pressure of less than 5 mm. of mercury absolute and a temperature of less than 260° C., removing from a lower portion of said evaporating zone a stream of both vaporized lower boiling constituents rich in fatty acids and residual liquids rich in unvaporized rosin acids, separating said vaporized lower boiling constituents from said residual rosin acids-rich liquid in a separate zone also maintained at a pressure of less than 5 mm., condensing said vaporized lower boiling constituents to obtain a fatty acids-rich liquid fraction, collecting and recycling said fatty acids-rich fraction through the same steps and in the same sequence hereinbefore recited until a fatty acids-rich fraction containing at least 85% of fatty acids by weight is obtained.

References Cited in the file of this patent

UNITED STATES PATENTS

| Number | Name | Date |
|---|---|---|
| Re. 22,775 | Potts | July 30, 1946 |
| 1,219,413 | Donk | Mar. 13, 1917 |
| 1,666,301 | Dew | Apr. 17, 1928 |
| 1,826,224 | Schultze | Oct. 6, 1931 |
| 1,846,681 | Gubelmann | Feb. 23, 1932 |
| 1,903,573 | Schulz | Apr. 11, 1933 |
| 1,997,171 | French | Apr. 9, 1935 |
| 2,054,096 | Potts et al. | Sept. 15, 1936 |
| 2,073,202 | Fawcett et al. | Mar. 9, 1937 |
| 2,143,344 | Frankel | Jan. 10, 1939 |
| 2,143,345 | Frankel | Jan. 10, 1939 |
| 2,266,941 | Van De Griendt | Dec. 23, 1941 |
| 2,274,801 | Mills | Mar. 3, 1942 |
| 2,274,802 | Mills | Mar. 3, 1942 |
| 2,311,180 | Bogart et al. | Feb. 16, 1943 |
| 2,361,411 | Murphy | Oct. 31, 1944 |

FOREIGN PATENTS

| Number | Country | Date |
|---|---|---|
| 106,325, | Sweden | Jan. 19, 1943 |